3,502,542
METHODS OF IMPROVING ADHESION
Werner J. Wenisch, Rutherford, N.J., assignor to Uniroyal, Inc., a corporation of New Jersey
No Drawing. Filed June 14, 1965, Ser. No. 463,882
Int. Cl. B32b 15/08; C09j 3/12
U.S. Cl. 161—216          19 Claims

ABSTRACT OF THE DISCLOSURE

Elastomer adhesion to metal surfaces is markedly improved by curing in the presence of N-maleamic acids, or N-maleimido compounds having at least one —COOH or —OH group, in a free radical environment while contacting the elastomer with the metal.

---

The present invention concerns an improved method of adhering metal to elastomers, and more particularly to saturated rubbers.

The problem of securing adequate adhesion of rubber to metal is one of long standing. Early attempts to solve this problem relied on physical means, such as the use of a plurality of wires so spaced, arranged or woven as to permit the rubber compound to enter into the interstices between the strands of wire and thus fixedly position the wire. This did not solve the problem as the strength of the construction depended upon the strength of the small webs or filaments of rubber entering into the interstices of the wire pattern. Later attempts to solve the problem involved a plurality of measures which were chemical in nature. One technique was to interpose between the normally contacting surfaces of the rubber and the metal certain heavy metal salts or organic acids, particularly the soaps of heavy metals and aliphatic fatty acids. The adhesion of rubber to metal was also improved somewhat by interposing layers of hard rubber compound, rubber isomers, rubber chloride (or hydrochloride) or other conversion products of natural rubber between the rubber and metal. The conversion products of rubber were prepared by reacting thin sections of natural rubber with a salt of a strong acid and a weak base. U.S. 2,619,445 describes a solution to the problem of adhering metals to certain copolymers containing rings having nitrogen atoms. None of these solutions was entirely satisfactory.

Perhaps the best known method of achieving rubber-to-metal adhesion was to choose brass as the metal, or to brass-plate another metal, and use relatively large amounts of sulfur in the rubber. Details of this method—in which the use of sulfur, preferably in high amounts, is said to be essential—are described by Buchan, "Rubber Metal Bonding," page 48 (Crosby Lockwood & Son, London, 1948).

The variety of useful rubbery materials having comparatively little unsaturation in some cases and none in others has increased in recent years, and yet improvements in bonding methods for them have not been forthcoming. Some of these new materials are cross-linked by non-sulfur curatives, and certain of the elastomers, such as those cured by a free radical system, cannot be cross-linked in the presence of large amounts of sulfur.

It is an object of this invention to provide a new and novel method for bonding elastomers to metals. It is a further object to provide a method of bonding to metals saturated rubbers and those rubbers containing only a small amount of olefinic unsaturation.

A further object is to provide a method of bonding rubbers to metals where the metals need not be brass or brass-plated and where relatively little, if any, sulfur is required. Still another object is to provide a method of bonding elastomers to metals during the curing step, thus avoiding any extra operations. Yet another object is to provide a method of bonding which requires neither the use of special adhesives nor the use of special rubbers.

The present invention attains the above objects by incorporating into the elastomer an acidic material which, in the presence of a free radical curing system, chemically bonds with the elastomer to cause superior adhesion of the elastomer to metal.

In the practice of this invention, the rubbery high polymer, the acidic material and, when appropriate, a chemical free radical source are first mixed, say on a two-roll mill, and thereafter cured in a conventional manner, as in a press, with the elastomer firmly pressed against the surface of the metal to be bonded. Fillers, such as blacks, processing aids (including oils of fatty acids) and other conventional compounding ingredients of rubber may be used as needed. The metal surface to which the elastomer is adhered should be free of dirt and other extraneous matter, although no special pickling or other surface-cleansing treatment is necessary.

Free radical curing systems are well known in the art, whether the release of the free radicals is caused by chemical or by physical means. Free radicals may be obtained chemically from the disintegration of organic peroxides and hydroperoxides (such as benzoyl peroxide, lauroyl peroxide, tert-butyl hydroperoxide, di-tert-butyl peroxide, and dicumyl peroxide) present in the compounded rubber. Although the organic peroxides and hydroperoxides are the preferred chemical sources of free radicals, other chemicals may also be used for this purpose, such as 2,2'-azobis(2-methylpropionitrile) and 1,3-diphenyltriazene. Alternatively, free radicals may be created physically by subjecting the mixture to ionizing radiation, such as X-rays, gamma rays, beta rays, high speed electrons, and high speed atomic particles, whether charged as in the case of protons and alpha particles or uncharged as in the case of neutrons. When the free radicals are created by physical means, there is no need to incorporate a free radical source in the compounded rubber.

The scope of elastomers suitable for use in the practice of this invention is broad. Any elastomer may be used which (1) is curable by the action of free radicals and (2) does not undergo excessive degradation in the presence of free radicals. One example of an *unsuitable* rubber is butyl rubber (also known as GR–I, for Government Rubber-Isobutylene), which is primarily monoolefinic isobutylene interpolymerized with a small amount of the *conjugated diene* isoprene; this rubber is degraded extensively by free radicals. The most important elastomers suitable for the purposes of this invention are the saturated rubbers, such as the rubbery copolymers of ethylene and propylene, since they are not vulcanizable by sulfur by ordinary methods, and hence the adhesive methods of the prior art depending upon high sulfur content cannot be adapted thereto. Other important elastomers are those terpolymers which contain a relatively small amount of unsaturation, such as the poly(ethylene/propylene/*non-conjugated diene*) rubbers. The non-conjugated diene, such as dicyclopentadiene or 1,4-hexadiene, is used in a minor amount relative to the monoolefins. It is known that such terpolymers can be usefully cured by free radical sources, despite the fact that butyl rubber, which contains a small amount of unsaturation derived from a *conjugated diene*, cannot be cured by free radical sources without excessive degradation due to the free radicals. Other elastomers which may be satisfactorily used in the practice of this invention—by way of non-limiting examples—include the highly unsaturated rubbers, such as SBR, an interpolymer of 76 parts of butadiene and 24 parts of styrene; Paracril B, an interpolymer of 75 parts of butadiene and 25 parts of acrylonitrile; inter polymers of a major portion of butadiene and a minor portion of vinylpyridine; and gum natural (hevea) rubber. The broad class of polyurethane rubbers provides other examples of specific suitable elastomers.

The particular acidic compounds which impart adhesive properties to the elastomer are the N-maleamic acids, and the N-maleimido compounds having at least one carboxylic acid or hydroxyl group. The acidic compounds are susceptible to attack by free radicals during the cross-linking reaction. This susceptibility means that an attacking free radical can either abstract an atom, (e.g., a hydrogen) from the acidic compound or itself add to the acidic compound (as by an olefinic bond addition) so as to convert the acidic compound into a radical which will chemically bond with the elastomer in such a way that the strongly polar carboxyl or hydroxyl groups thus attached to the elastomer impart their polar effects to the elastomer, thereby improving its adhesive properties.

Specific examples of those N-maleamic acids and N-maleimido compounds having at least one carboxylic acid or hydroxyl group which are preferred in the practice of the instant invention are the aromatic compounds including: N-carboxyphenylmaleamic acid (especially the para or meta substituted compounds, e.g., N-(4-carboxyphenyl)-maleamic acid and N-(3-carboxyphenyl) maleamic acid) and N-maleimido-benzoic acid (especially the para or meta substituted compounds, e.g., N-(4-maleimido)-benzoic acid and N-(3-maleimido)benzoic acid), and N-(4-hydroxyphenyl)maleimide. Carboxylic acid compounds containing more than one N-maleimido or N-maleamic acid radicals, e.g., N,N'-(1,3-phenylene)dimaleamic acid, are also suitable, although not preferred.

These acidic compounds, which impart adhesive properties to the elastomer by chemically combining therewith, may so combine with the elastomer independently of the cross-linking or by participating in the cross-linking.

The following examples illustrate the invention in more detail. All parts are by weight. Tensile strength, elongation at break, and modulus of elasticity were measured according to the procedures of the American Society for Testing & Materials (ASTM) D412; Shore A hardness, according to the procedure of ASTM D676–59T.

Adhesion tests of a given rubber to hot-rolled steel plates and to aluminum plates were made according to ASTM D429–58, Method "B" ("90° Stripping Test—Rubber Part Assembled To One Metal Plate"), hereinafter referred to as Method 1.

Test specimens for adhesion of a given rubber to metal wire were prepared by curing a 1" x 1" x ½" block of the rubber in a press, the wire being positioned in the rubber during the cure in such a way that a 1" length of the wire was firmly pressed within and against the curing rubber. Adhesion tests were made by placing the resulting cured test specimen in a Scott tensile tester in such a way that the wire could be pulled longitudinally through the firmly held rubber and then measuring the force (pounds per inch of width or p.i.) required to pull a 1" length of adhered wire from the block of rubber at a jaw separation rate of 2" per minute. This method will be referred to hereinafter as Method. 2.

In a third method of testing the adhesion of a given rubber to metal, test samples were prepared by positioning two metal strips (1' x 3" x ⅛") lengthwise with one end of one strip overlapping one end of the other strip by 1". This assembly was placed in a suitable mold with a ¹⁄₃₂" intervening layer of rubber between the strips in the overlapped area and presscured. The assembly was then placed in an Instron tester by attaching the far ends of the assembly to the tester. The shearing force (pounds per square inch of width or p.s.i.) required to separate the test piece at a jaw separation rate of 0.2" per minute (unless otherwise indicated) was measured. This method will be referred to hereinafter as Method 3.

EXAMPLE I

This example illustrates the invention as applied to the bonding of metal to a rubbery high copolymer of ethylene/propylene suitably compounded for use as a tire tread composition. The compounding was performed conventionally on a two-roll mill, and the stocks of Table I were cured conventionally for thirty minutes at 320° F.

TABLE I

| Stock code | A | B | C | D |
| --- | --- | --- | --- | --- |
| Stock composition: | | | | |
| Ethylene/propylene elastomer [1] | 100 | 100 | 100 | 100 |
| Philblack O [2] | 50 | 50 | 50 | 50 |
| Sulfur | .15 | .15 | .15 | .15 |
| Dicup 40C [3] | 5. | 5. | 5. | 5. |
| 4-(N-maleimido)benzoic acid | | .5 | 1.0 | 2.5 |
| Physical properties: | | | | |
| Tensile strength, p.s.i | 2,860 | 2,755 | 2,575 | 2,640 |
| Elongation at break, percent | 490 | 500 | 470 | 500 |
| 300% modulus, p.s.i | 1,275 | 1,255 | 1,250 | 1,260 |
| Shore A hardness | 62 | 62 | 63 | 64 |
| Adhesion [4] to hot rolled steel, p.s.i. | 0 | 20 | 95 | 125 |
| Adhesion [5] to .037" diameter brass-plated tire beadwire; p.i. | 43 | 69 | 110 | 104 |
| Adhesion [5] to brass-coated wire; bundle of 21 strands, .005" diameter; p.i. | 34 | 45 | 52 | 64 |
| Adhesion [5] to galvanized wire; 21 strands, .0059" diameter; p.i. | 22 | 34 | 33 | 52 |
| Adhesion [5] to galvanized wire; bundle of 6 strands, .005" diameter; p.i. | 6 | 37 | 52 | 39 |

[1] Interpolymer of 48 parts of ethylene and 52 parts of propylene.
[2] High abrasion furnace black marketed under the registered trademark Philblack 0 by the Phillips Chemical Co.; surface area=69.2 square meters per gram.
[3] 40% dicumyl peroxide supported on finely divided CaCO₃ and marketed by Hercules Powder Co.
[4] Method 1.
[5] Method 2.

The adhesion of metals to a rubber having physical properties suitable for use as tire tread stock was markedly improved by the presence of 4-(N-maleimido) benzoic acid in the stock.

EXAMPLE II

The procedure followed in this example is similar to that of Example I except that the ethylene/propylene elastomer stock was modified as shown in Table II to give a composition suitable for use in the beadwire section of a tire. Again the stock was cured for thirty minutes at 320° F.

TABLE II

| Stock code | E | F | G | H | I | J |
|---|---|---|---|---|---|---|
| Stock composition: | | | | | | |
| Ethylene/propylene elastomer [1] | 100 | 100 | 100 | 100 | 100 | 100 |
| Pelletex (carbon black) [2] | 125 | 125 | 125 | 125 | 125 | 125 |
| Pale Oil 160-180 [3] | 10 | 10 | 10 | 10 | 10 | 10 |
| Dicup 40C [1] | 8 | 1.5 | 1.5 | 1.5 | 1.5 | 1.5 |
| Sulfur | .2 | | | | | |
| N,N'-(1,3-phenylene) dimaleimide (vulcanizing agent) | | 3.0 | 3.0 | 3.0 | 3.0 | 3.0 |
| 4-(N-maleimido)benzoic acid | | | .5 | 1.0 | 2.5 | 5.0 |
| Physical properties: | | | | | | |
| Tensile strength, p.s.i | 2,230 | 1,465 | 1,420 | 1,470 | 1,405 | 1,380 |
| Elongation at break, percent | 200 | 210 | 230 | 220 | 230 | 220 |
| 200% modulus, p.s.i | 1,650 | 1,075 | 1,050 | 1,035 | 950 | 965 |
| Adhesion [4] to hot-rolled steel, p.s.i | | | | 73 | 76 | 78 |
| Adhesion [5] to .037" diameter brass-coated tire beadwire; p.i | 44 | 57 | 89 | 95 | 95 | 98 |
| Adhesion [5] to .030" diameter piano-wire; pi.[1] | 7 | 44 | 63 | 82 | 89 | 90 |
| Adhesion [5] to galvanized wire; bundle of 21 strands, .0059" diameter; p.i | 20 | 40 | 63 | 62 | 61 | 59 |

[1] See Table I for description.
[2] A semi-reinforcing furnace black marketed under the trademark name of Pelletex by the Godfrey L. Cabot Company; surface area=23 square meters per gram.
[3] A light colored paraffinic oil with a Saybolt Universal viscosity of 160-180 seconds at 100° F.; specific gravity=0.863; aniline point=219; flash point=420° F. (open cup).
[4] Method 1.
[5] Method 2.
[6] Steel wire containing 0.8% carbon.

The adhesion of metals to a stock having physical properties suitable for use as tire beadwire sections was markedly improved by the presence of 4-(N-maleimido)-benzoic acid

EXAMPLE III

This example illustrates the use of a N-maleimido compound having an hydroxy group to impart adhesive properties to an ethylene/propylene elastomer. The stock was compounded and cured as described in Example I.

TABLE III

| Stock code | A | B | C | D |
|---|---|---|---|---|
| Stock composition: | | | | |
| Ethylene/propylene Elastomer [1] | 30 | 30 | 30 | 30 |
| Dicup 40C [1] | | 1.3 | | 1.0 |
| N-(4-hydroxy phenyl) maleimide | | | 1.3 | 1.39 |
| Physical properties adhesion [2] to aluminum alloys, p.s.i | 29.5 | 31.8 | 42.8 | 111.0 |

[1] See Table I for description.
[2] Method 3 with jaw separation rate of 1" per minute.

The adhesion properties of the rubber to the aluminum alloy were markedly improved by the incorporation of the N-(4-hydroxyphenyl)maleimide.

EXAMPLE IV

This example illustrates the use of 4-(N-maleimido) benzoic acid to increase the adhesion of polyurethane rubbers to metals. The particular raw gum polyurethane rubber used in Table III was made by first mixing 462 parts of anhydrous poly(ethylene/propylene) adipate (70 parts ethylene to 30 parts propylene by weight), 103 parts of diphenyl methane diisocyanate and 8 parts of allyl alcohol. After mixing at about 90° C. for about 100 minutes, 15 parts of p,p'-diamino-diphenylmethane were added. The temperature was raised to 115° C., and the mixing continued for about 5 to 10 minutes more. The resultant rubber had a Mooney viscosity of over 150 (ML-4/100° C.). The rubber was then cured for 30 minutes at 308° F.

TABLE IV

| Stock code | K | L | M | N |
|---|---|---|---|---|
| Stock composition: | | | | |
| Polyurethane rubber | 100 | 100 | 100 | 100 |
| Philblack O (carbon black)[1] | 30 | 30 | 30 | 30 |
| Stearic acid | .3 | .3 | .3 | |
| Dicup 40C [1] | 4. | 5. | 6. | 4.5 |
| 4-(N-maleimido) benzoic acid | | .75 | 1.25 | .75 |
| Physical properties: | | | | |
| Tensile strength, p.s.i | 3,870 | 4,480 | 4,340 | 3,605 |
| Elongation at break, percent | 570 | 550 | 490 | 490 |
| 300% modulus, p.s.i | 1,350 | 1,675 | 1,875 | 1,500 |
| Shore A hardness | 56 | 58 | 62 | 57 |
| Adhesion [2] to hotrolled steel, p.s.i | 0 | 1,130 | 1,280 | 1,270 |
| Adhesion [2] to aluminum, p.s.i | 0 | 520 | 505 | 590 |
| Adhesion [2] to galvanized steel, p.s.i | 0 | 120 | 360 | 345 |

[1] See Table I for description.
[2] Method 3.

The data in Table IV show that the presence of 4-(N-maleimido) benzoic acid produces an effective bond between the metals and the rubber. Under the same conditions except that this chemical is absent, there is no measurable adhesion between the rubber and the metals.

EXAMPLE V

This example illustrates the application of the invention to styrene/butadiene rubber. The stock composition of Table V is based on the SBR defined in ASTM D1419–58T, a commercially available styrene/butadiene copolymer elastomer containing about 20–23% bound styrene. The stock was cured for 45 minutes at 320° F.

TABLE V

| Stock Code | O | P | Q | R |
|---|---|---|---|---|
| Stock composition: | | | | |
| Styrene/butadiene rubber | 100 | 100 | 100 | 100 |
| Philblack O (carbon black)[1] | 50 | 50 | 50 | 50 |
| Circosol 2XH [2] | 7.5 | 7.5 | 7.5 | 7.5 |
| Dicup 40C [1] | .7 | .7 | .7 | .7 |
| 4-(N-maleimido) benzoic acid | 5 | | | |
| 3-(N-maleimido) benzoic acid | | 4 | | |
| N,N'-(1,3-phenylene) dimaleamic acid | | | 1.5 | |
| N-(phenyl) maleimide | | | | 4 |
| Benzoic acid | | | | 2.8 |
| Physical properties: | | | | |
| Tensile strength, p.s.i | 2,915 | 2,250 | 2,230 | 3,060 |
| Elongation at break, percent | 530 | 580 | 420 | 520 |
| 300% modulus, p.s.i | 1,075 | 810 | 1,100 | 1,180 |
| Shore A hardness | 58 | | 52 | 54 |
| Adhesion [3] to hot-rolled steel, p.s.i | 2,225 | 1,720 | 1,620 | 85 |
| Adhesion [3] to brass, p.s.i | 2,015 | | | |
| Adhesion [3] to aluminum, p.s.i | 440 | | | 25 |
| Adhesion [3] to galvanized steel, p.s.i | 460 | | | |

[1] See Table I for description.
[2] A pale green, transparent, heavy, viscous, odorless, naphthenic petroleum hydrocarbon oil of high molecular weight and low volatility; specific gravity of 0.94; Saybolt Universal viscosity at 100° F. of about 200 sec.
[3] Method 3.

The data in Table V show that whereas the incorporation of N-maleimido-benzoic acids or maleamic acids (e.g., N,N'-(1,3-phenylene)dimaleamic acid) gives stocks having useful adhesion to metals, the incorporation of a benzoic acid in combination with a maleimide *not* having a carboxyl group attached thereto (e.g., N-(phenyl) maleimide) does not produce stocks having useful adhesion to metals.

Examples II, III, IV and V further demonstrate the utility of the invention in producing desirable adhesion despite the absence of sulfur, adhesives or brass.

EXAMPLE VI

That the instant invention is not applicable to a butyl rubber which contains a small amount of unsaturation derived from a conjugated diene is illustrated by incorporating N-(4-carboxyphenyl) maleimide and DiCup 40C into butyl rubber.

TABLE VI

| Stock code | A | B | C | D |
|---|---|---|---|---|
| Stock composition: | | | | |
| Butyl rubber | 30 | 30 | 30 | 30 |
| Dicup 40C [1] | | 1.33 | | 1.33 |
| N-(4-carboxyphenyl) maleimide | | | 1.33 | 1.33 |
| Physical properties: | | | | |
| Adhesion [2] to aluminum alloy, p.s.i. | 35 | 13.6 | 25.8 | 12.7 |

[1] See Table I for description.
[2] Method 3 with jaw separation rate of 1″ per minute.

The adhesion test not only shows the lack of effect of the additives, but also shows that the additives are detrimental.

It should be understood that the precise proportions of the materials utilized may be varied, equivalent chemical materials may be employed, and reaction conditions may be modified according to known principles of thermodynamics and kinetics, if desired.

Having thus described my invention, what I claim and desire to protect by Letters Patent is:

1. A method of bonding metal to a rubbery elastomer comprising the steps of (1) incorporating an acidic compound into a rubbery elastomer which is curable by free radicals and which is substantially undegradable by free radicals, said acidic compound being selected from the group consisting of N-maleamic acids, N-maleimido compounds having at least one carboxylic acid group and N-maleimido compouds having at least one hydroxyl group; and (2) introducing free radicals to said elastomer to cure said elastomer while contacting said metal and said elastomer.

2. The method of claim 1 wherein said elastomer is substantially completely chemically saturated.

3. The method of claim 1 wherein said elastomer is a substantially saturated copolymer of a major proportion of at least one monoethylenically unsaturated monomer and a minor proportion of a non-conjugated diene.

4. The method of claim 1 wherein said elastomer is polyurethane.

5. The method of claim 1 wherein said elastomer is ethylene/propylene copolymer.

6. The method of claim 1 wherein said elastomer is styrene-butadiene copolymer.

7. The method of claim 1 wherein said acidic compound is aromatic.

8. The method of claim 7 wherein said acidic compound has an aromatic component selected from the group consisting of meta and para substituted benzenes.

9. The method of claim 1 wherein said acidic compound is an N-carboxyphenyl-maleamic acid.

10. The method of claim 1 wherein said acidic compound is an N-maleimido-benzoic acid.

11. The method of claim 1 wherein said acidic compound is N,N'-(1,3-phenylene) dimaleamic acid.

12. The method of claim 1 wherein said acidic compound is N-(4-hydroxyphenyl) maleimide.

13. The method of claim 1 wherein a free radical source is incorporated into said elastomer in step (1) and heated in step (2) to produce said free radicals.

14. The method of claim 1 wherein from about 0.5 to about 5.0 parts of said acidic compound are incorporated in step (1) into about 100 parts by weight of said elastomer.

15. The method of claim 1 wherein said acidic compound contains only one radical selected from the group consisting of N-maleimido or N-maleamic acid radicals.

16. A method in accordance with the method of claim 1, wherein following step (1) and step (2), there is the additional step (3) of applying heat.

17. The product produced in accordance with the method of claim 1.

18. The product produced in accordance with the method of claim 13.

19. The product product produced in accordance with the method of claim 16.

References Cited

UNITED STATES PATENTS

| 2,958,672 | 11/1960 | Goldberg | 260—878 |
| 2,965,553 | 12/1960 | Dixon et al. | 260—878 |
| 3,113,934 | 12/1963 | Grossman | 260—878 X |
| 3,236,917 | 2/1966 | Natta et al. | 260—878 |
| 3,257,352 | 6/1966 | Ottenheym et al. | 260—94.96 |
| 3,262,986 | 7/1966 | Kuipers | 260—878 |
| 3,328,362 | 6/1967 | Roberts et al. | |
| 2,888,424 | 5/1959 | Precopio et al. | |
| 2,936,261 | 5/1960 | Cole. | |
| 3,000,866 | 9/1961 | Tawney. | |
| 3,024,813 | 3/1962 | Sear et al. | 156—110 X |
| 3,325,325 | 6/1967 | Ward. | |

OTHER REFERENCES

Alliger, G., and Sjothun, I. J., "Vulcanization of Elastomers," Reinhold Pub. Corp., New York City, copyright 1964, pages 356–358.

EARL M. BERGERT, Primary Examiner

C. B. COSBY, Assistant Examiner

U.S. Cl. X.R.

156—331, 334; 161—217, 221; 260—94.9, 878